United States Patent
Wette et al.

(10) Patent No.: US 12,305,811 B2
(45) Date of Patent: May 20, 2025

(54) METHOD FOR A COMMUNICATION BETWEEN A FUELING DEVICE AND A VEHICLE

(71) Applicant: Robert Bosch GmbH, Stuttgart (DE)

(72) Inventors: Philip Wette, Bueckeburg (DE); Thomas Keller, Rottweil (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 18/552,539

(22) PCT Filed: Mar. 29, 2022

(86) PCT No.: PCT/EP2022/058239
§ 371 (c)(1),
(2) Date: Sep. 26, 2023

(87) PCT Pub. No.: WO2022/214354
PCT Pub. Date: Oct. 13, 2022

(65) Prior Publication Data
US 2024/0167633 A1 May 23, 2024

(30) Foreign Application Priority Data
Apr. 6, 2021 (DE) ...................... 10 2021 203 386.5

(51) Int. Cl.
*F17C 13/02* (2006.01)
*F17C 5/00* (2006.01)
(52) U.S. Cl.
CPC ............ *F17C 13/025* (2013.01); *F17C 5/007* (2013.01); *F17C 13/023* (2013.01);
(Continued)

(58) Field of Classification Search
None
See application file for complete search history.

(56) References Cited

U.S. PATENT DOCUMENTS 5,029,622 A * 7/1991 Mutter .................... F17C 13/02
141/94
5,406,988 A * 4/1995 Hopkins ................... F17C 7/00
141/54
(Continued)

FOREIGN PATENT DOCUMENTS

EP 2428286 A2 3/2012
JP H07288505 A 10/1995
(Continued)

OTHER PUBLICATIONS

Translation of International Search Report for Application No. PCT/EP2022/058239 dated Aug. 2, 2022 (2 pages).

*Primary Examiner* — Matthew W Jellett
(74) *Attorney, Agent, or Firm* — Michael Best & Friedrich LLP

(57) ABSTRACT

The invention relates to a method for a communication between a fueling device (2) and a vehicle (4), having the steps of coupling the fueling device to a tank (6) of the vehicle by means of a fuel hose (10), providing pressurized fuel to the fuel hose, varying the pressure on the fuel hose by superimposing a specified base pressure with a pressure sequence in order to modulate a first signal to be transmitted, detecting the pressure being applied to the fuel hose by means of the vehicle, and extracting the first signal to be transmitted from the detected pressure.

10 Claims, 2 Drawing Sheets

(52) U.S. Cl.
CPC .. *F17C 2205/058* (2013.01); *F17C 2221/012* (2013.01); *F17C 2250/034* (2013.01); *F17C 2250/0434* (2013.01); *F17C 2265/065* (2013.01)

(56) References Cited

U.S. PATENT DOCUMENTS

| | | | | |
|---|---|---|---|---|
| 5,479,966 | A * | 1/1996 | Tison | F17C 5/06 141/83 |
| 5,671,786 | A | 9/1997 | Corfitsen | |
| 5,810,058 | A * | 9/1998 | Kountz | F17C 13/026 141/2 |
| 6,834,688 | B2 * | 12/2004 | Ono | F17C 6/00 141/94 |
| 7,896,036 | B2 * | 3/2011 | Kobayashi | F17C 5/06 141/94 |
| 8,122,918 | B2 * | 2/2012 | Handa | F17C 5/00 141/192 |
| 8,656,938 | B2 * | 2/2014 | Hobmeyr | F17C 5/06 141/2 |
| 9,022,080 | B2 * | 5/2015 | Cun | B60L 58/32 141/94 |
| 9,471,066 | B2 * | 10/2016 | Ding | G01F 15/003 |
| 9,494,947 | B2 * | 11/2016 | Hirata | G05D 7/0617 |
| 10,082,247 | B1 * | 9/2018 | Sinding | F17C 13/025 |
| 10,288,222 | B2 * | 5/2019 | Sinding | F17C 13/026 |
| 10,648,618 | B2 * | 5/2020 | Uchida | F17C 13/02 |
| 11,353,352 | B2 * | 6/2022 | Somani | G01F 1/48 |
| 11,885,465 | B2 * | 1/2024 | Minas | F17C 13/04 |
| 2013/0018504 | A1 | 1/2013 | Oldham | |
| 2016/0215615 | A1 | 7/2016 | Gorrara | |

FOREIGN PATENT DOCUMENTS

| | | |
|---|---|---|
| JP | H09276432 A | 10/1997 |
| JP | 2003509628 A | 3/2003 |

* cited by examiner

METHOD FOR A COMMUNICATION BETWEEN A FUELING DEVICE AND A VEHICLE

BACKGROUND OF THE INVENTION

The present invention relates to a method for a communication between a fueling device and a vehicle and a system for a communication between a fueling device and a vehicle.

For the fueling of trucks with hydrogen, it is provided according to SAE J2799 to use a constant, relatively low hydrogen pressure on the fueling device in order to avoid damage to the tank being filled. For this purpose, a current internal pressure of the water hydrogen tank is sent to the fueling device prior to fueling. This communication can be via an infrared interface (irDA). By means of the transferred internal pressure and the external temperature determined by the fueling device, a secure pressure increase as well as a secure target value for the internal pressure of the tank is determined according to SAE J2799. These parameters are then used by the fueling device to fuel the water tank. By using irDA, the communication between the fueling device and the hydrogen tank tends to be prone to error, because the infrared content of the sunlight alone can be sufficient to disrupt the communication. Scratches on a transmitter and receiver optics as well as ice formation around a fuel hose or nozzle can also have a disruptive effect. Subsequently, no parameters can be exchanged, and the fueling process will take place at very low hydrogen pressure only, so that the fueling process is lengthy.

To optimize the fueling operation, in particular to shorten the fueling duration, methods are known in which the vehicle and the fueling device are in a signal connection and dynamically set a maximum secure hydrogen pressure for fueling at any given time. This requires interference-resistant communication technology. In addition to interference-free communication, a clear assignment of the communication partners is a challenge, in particular at fueling stations with a plurality of fueling devices and a higher fueling frequency.

In U.S. Pat. No. 9,022,080 B2, it is proposed that the aforementioned assignment problem can be solved by a correlated of a mass flow of hydrogen into the tank and a corresponding increase of the pressure in the tank. For this purpose, at a given time, the fueling device changes the mass flow for a short time, observing the pressure in the tank transmitted via a radio connection. As a result, a correlation and consequently a clear assignment of the radio communication partners can take place.

SUMMARY OF THE INVENTION

It is consequently the problem addressed by the invention to achieve a secure communication connection between a fueling device and a vehicle, wherein the communication partners are always clearly assigned.

The invention relates to a method for a communication between a fueling device and a vehicle, having the steps of coupling the fueling device to a tank of the vehicle by means of a fuel hose, providing pressurized fuel to the fuel hose, varying the pressure on the fuel hose by superimposing a specified base pressure with a pressure sequence in order to modulate a first signal to be transmitted, detecting the pressure being applied to the fuel hose by means of the vehicle, and extracting the first signal to be transmitted from the detected pressure.

A core aspect of the invention is that the transmission of a first signal from the fueling device to the vehicle is accomplished by modulating an output pressure. This allows targeted data to be sent from the fueling device to the vehicle to be fueled, independently of wireless infrastructure and independently of an irDA procedure that can be susceptible to errors. One requirement for carrying out the method is the possibility of specifically changing the pressure at the fueling device in as discrete a form as possible so that a pressure sequence is clearly discernibly modulated and can be extracted by demodulation on the vehicle for obtaining the underlying first signal.

The coupling of the fueling device and the tank is accomplished by mechanically connecting the fuel hose to a fuel nozzle on the vehicle. The commencement of the fueling operation can occur directly after the coupling operation. For this purpose, the coupling could be connected, for example, by actuating an activation switch through which the fueling operation is initiated.

The fueling device is configured to provide the fuel pressurized on the fuel hose. For this purpose, the fueling device can comprise a pump used in order to direct the fuel from a reservoir to the fuel hose. Different variants are contemplated for the pump, and the invention is not limited to a particular type of pump, rather all suitable pumps and assemblies comprising pumps are explicitly covered.

In order to change the pressure on the fuel hose, it is contemplated that the aforementioned pump will provide the base pressure. The pump could be coupled to a valve assembly arranged downstream of the pump. The valve assembly could include a pressure reduction valve or pressure control valve assembly. It is contemplated that a rapid change in pressure of the fuel hose is achieved by switching at least one valve. However, the pump could also be configured to directly carry out rapid pressure changes. The pressure sequence, which is modulated on the base pressure, does not necessarily have to comprise an additional pressure, but could also be realized in the form of a selective pressure reduction.

The vehicle in which the tank to be filled is arranged has at least one tank pressure sensor configured to detect a pressure inside the tank. This also depends on the pressure on the fuel hose. Consequently, if the pressure of the fuel in the fuel hose changes, it can also be detected by the tank pressure sensor. The vehicle could have a control unit connected to the tank pressure sensor. The detected internal pressures could then be recorded continuously in the control unit, at least temporarily. This results in an internal pressure curve or an internal pressure curve over time. By filtering, depending on the modulation method used, the pressure sequence can be extracted from the recorded pressure curve. Thereby, at least a unidirectional transmission of a first signal from the fueling device to the vehicle can occur.

A modulation could occur by means of pulse width modulation (PWM), for example, wherein other modulation techniques already known from other fields are of course contemplated. The base pressure in the system does not have to be kept stable over time, but rather could also increase or decrease.

It is further contemplated that the vehicle is configured to detect a pressure on the fuel nozzle even if no fuel is flowing. Thus, a first signal can still be detected by the vehicle, for example before a tank valve on the fuel nozzle is opened.

This type of communication eliminates susceptibility to error, in particular, of irDA against external influences, and also only uses hardware components already found in tanks and pumps. In addition, the method also has significant advantages over radio technologies that are used as an alternative to irDA, because the assignment problem presented above does not occur in the communication via the method according to the invention. It is also contemplated to use the method according to the invention in order to solve the assignment of communication partners, in order to subsequently use a radio connection of the identified communication partners.

In an advantageous embodiment, the vehicle further comprises varying a mass flow through the vehicle tapped from the vehicle by superimposing a specified base mass flow with a mass flow sequence in order to modulate a second signal to be transmitted, and detecting the mass flow passing through the fuel hose through the fueling device and extracting the second signal to be transmitted from the detected mass flow. Similar to the concept of transmitting a first signal from the fueling device to the vehicle as described above, a second signal can also be transmitted from the vehicle to the fueling device by influencing the mass flow. Thus, the method allows for a bi-directional communication between the fueling device and the vehicle. A tank valve or a tank valve assembly could be provided on the vehicle side in order to influence the mass flow. To detect the mass flow, the fueling device can comprise a mass flow sensor that can be coupled to a control unit. The detected mass currents could then be recorded continuously in the control unit, at least temporarily. This results in a mass flow curve or a mass flow profile over time. By filtering, the mass flow sequence can be extracted from the recorded mass flow profile. The mass flow, as well as the pressure, need not be constant here, but can increase or decrease over time.

In a further advantageous embodiment, the method further comprises exchanging identification features of the fueling device and the vehicle or a cryptographic key, and establishing a radio connection of the fueling device and the vehicle using the identification features or the cryptographic key. Accordingly, the method according to the invention is primarily used in this embodiment in order to initiate a secure and unique radio connection. The method allows for a very reliable assignment of the communication partners for the radio connection.

In an advantageous embodiment of the method, the base pressure increases or decreases over time. When controlling the fueling, the base pressure can be adjusted during fueling depending on the outside temperature and/or tank pressure.

The pressure sequence could further be based on a rectangular, sinusoidal, or sawtooth signal, wherein an amplitude of the rectangular, sinusoidal, or sawtooth signal falls below the base pressure. The pressure sequence could also deviate slightly from the rectangular, sinusoidal, or sawtooth signal, because the pressure change is initiated with such a signal, but, depending on the design of the pump or a valve assembly connected thereto, a pressure change does not occur immediately but rather with a certain inertia. This is taken into account by the term "based on". In addition to an amplitude modulation, a frequency modulation can also be contemplated.

The method can further comprise the initiation of a fueling operation at a specified safe minimum pressure as the base pressure, after which the varying of the pressure occurs. The secure minimum pressure could be chosen such that all contemplated tanks fueled by the fueling device are fueled at such a secure pressure that damage to the tank is excluded.

Particularly preferably, the method further comprises a control of the pressure at the fueling device for accelerated fueling based on a pressure request transmitted by the vehicle by means of the second signal. The instantaneous tank pressure, a desired pressure on the fuel hose, or other parameters could be transmitted before, during, and/or after a fueling operation.

The invention analogously relates to system for a communication between a fueling device and a vehicle, wherein the fueling device comprises a fuel hose that can be coupled to a tank of the vehicle, wherein the fueling device is configured to provide a fuel that has been subjected to variable pressure through the fuel hose, wherein the fueling device comprises a first control unit, which is configured to cause the pressure to vary on the fuel hose by superimposing a specified base pressure with a pressure sequence in order to modulate a first signal to be transmitted, wherein the vehicle comprises a second control unit, which is configured to detect the pressure being applied to the fuel hose via a tank pressure sensor and to extract the first signal to be transmitted from the detected pressure.

In one advantageous embodiment, the second control unit is configured to vary, by means of a tank valve, a mass flow by superimposing a specified base mass flow with a mass flow sequence in order to modulate a second signal to be transmitted, and wherein the first controller is configured to detect via a mass flow sensor the mass flow passing through the fuel hose and to extract the second signal to be transmitted from the detected mass flow.

Particularly preferably, the fueling device is a hydrogen fueling device.

BRIEF DESCRIPTION OF THE DRAWINGS

Further measures improving the invention are described in more detail below on the basis of the figures, together with the description of the preferred exemplary embodiments of the invention.

The figures show.

DETAILED DESCRIPTION

Figure 1:
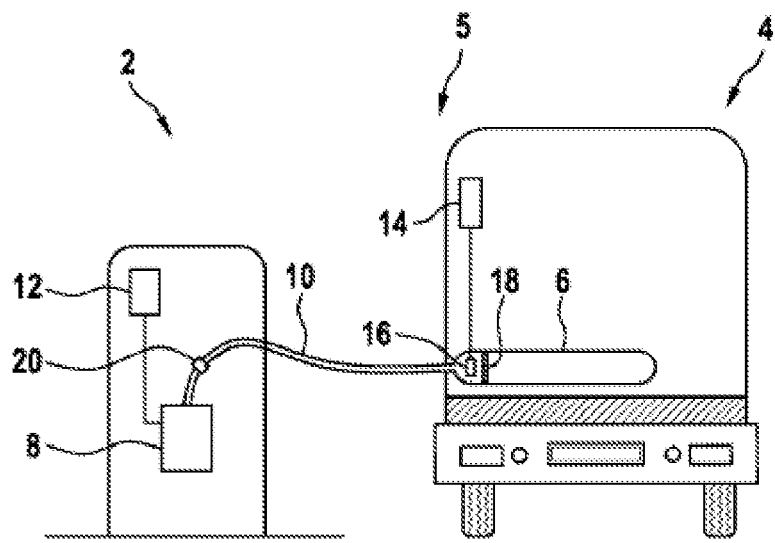
FIG. 1 a fueling device and a vehicle forming a system for a communication.

FIG. 1 shows a fueling device 2 and a vehicle 4 comprising a tank 6 to be filled by the fueling device 2. In this exemplary embodiment, the tank 6 is a hydrogen tank and fueling device 2 is a hydrogen fueling device. The fueling device 2 comprises a pump 8 connected to a hydrogen reservoir, not shown. Through a fuel hose 10, the fueling device 2 can supply hydrogen to the tank 6.

The fueling device 2 comprises a first control unit 12 coupled to the pump 8. Thus, the fueling device 2 is configured to provide the hydrogen at a variable pressure in the fuel hose 10. The first control unit 12 is configured to cause the pressure on the fuel hose 10 to vary by superimposing a specified base pressure with a pressure sequence in order to modulate a first signal to be transmitted.

The vehicle 4 comprises a second control unit 14 connected to a tank pressure sensor 16. The second control unit 14 is configured to detect the pressure being applied to the fuel hose 10 and extract the first signal to be transmitted from the detected pressure.

The vehicle 4 can further comprise a tank valve 18 coupled to the second control unit 14 and configured to regulate a mass flow entering the tank 6. By way of example, the second control unit 14 is configured to vary the mass flow by superimposing a specified base mass flow with a mass flow sequence in order to modulate a second signal to be transmitted by means of the tank valve 18. The first control unit 12 is coupled to a mass flow sensor 20 configured to detect the mass flow flowing through the fuel hose 10. The first control unit 12 can consequently detect the mass flow via the mass flow sensor 20 and extract the second signal to be transmitted from the detected mass flow. As a result, the fueling device 2 and the vehicle 4 can communicate by selectively changing fueling characteristics of the hydrogen.

Figure 2:
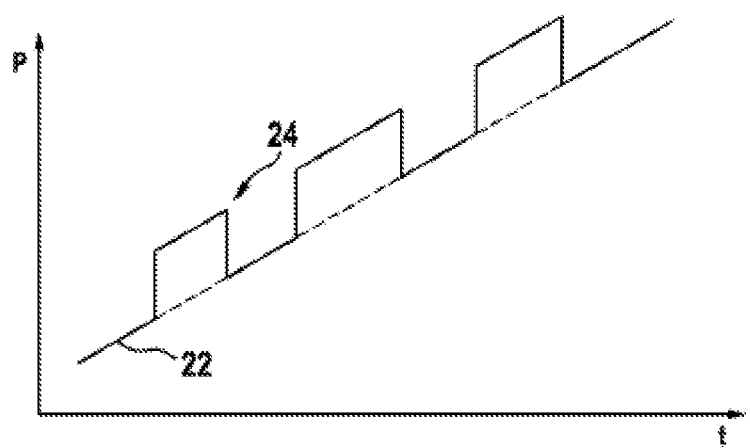
FIG. 2 a pressure profile on the fuel hose.

FIG. 2 illustrates by way of example a pressure curve that can be generated by the fueling device 2 for transmitting the first signal. Here, a base pressure 22 is shown that continuously rises over time. However, it could also have a different course and could be constant, for example, increasing and/or decreasing and/or staying constant in regions. A pressure sequence 24 in the form of a rectangular signal is superimposed on the base pressure 22. This means that the pressure on the pump 8 is selectively increased at several intervals so that the pressure profile shown in FIG. 2 is created. This is contemplated in the same way as the mass flow affected by the vehicle 4 in order to transmit a second signal to the fueling device.

Figure 3:
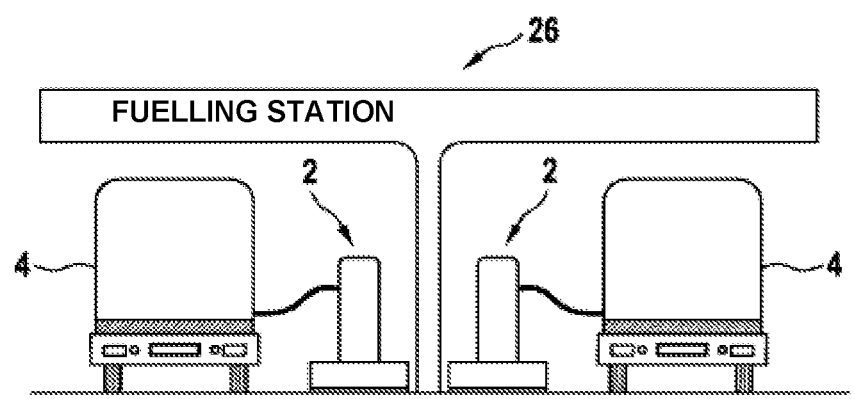
FIG. 3 a fueling station.

FIG. 3 shows a fueling station 26 with a plurality of fueling devices 2. Here, two vehicles 4 are respectively coupled to one of the fueling devices 2 via a fuel hose 10. By transmitting first and optionally second signals, the vehicles 4 can obtain cryptographic keys or identification features from the fueling device 2, through which they can establish a wireless radio connection with a clear assignment of the communication partners. This is sensible for such fueling stations 26 with neighboring fueling devices 2, because a plurality of vehicles 4 can each be in a radio range of the fueling devices 2 and require a clear assignment for secure communication.

Figure 4:
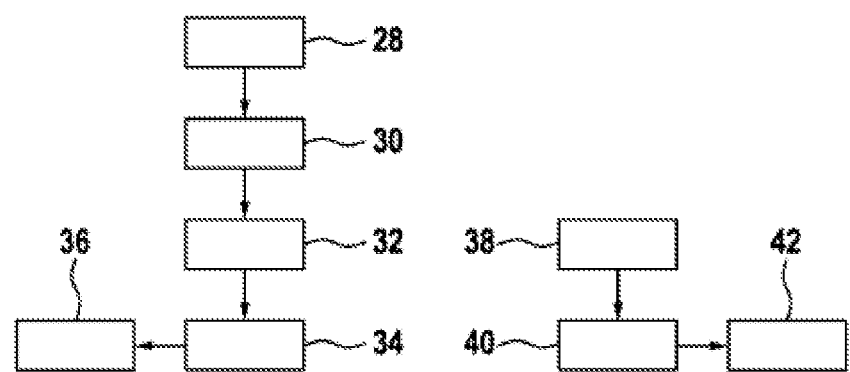
FIG. 4 a schematic representation of the method according to the invention.

FIG. 4 shows a schematic block view of the method according to the invention. The method comprises steps of coupling 28 the fueling device 2 to a tank 6 of the vehicle 4 by means of a fuel hose 10, providing 30 pressurized fuel to the fuel hose 10, varying 32 the pressure on the fuel hose 10 by superimposing a specified base pressure 22 with a pressure sequence 24 in order to modulate a first signal to be transmitted, detecting 34 the pressure being applied to the fuel hose by means of the vehicle 4, and extracting 36 the first signal to be transmitted from the detected pressure.

As described above, the method can also comprise varying 38 a mass flow through the vehicle 4 tapped from the vehicle 4 by superimposing a specified base mass flow with a mass flow sequence in order to modulate a second signal to be transmitted, and detecting 40 the mass flow passing through the fuel hose 10 through the fueling device 2 and extracting 42 the second signal to be transmitted from the detected mass flow.

The invention claimed is:

1. A method for a communication between a fueling device (2) and a vehicle (4), having the steps of:
coupling (28) the fueling device (2) to a tank (6) of the vehicle (4) by means of a fuel hose (10),
providing (30) pressurized fuel to the fuel hose (10),
varying (32) the pressure on the fuel hose (10) by superimposing a specified base pressure (22) with a pressure sequence in order to modulate a first signal to be transmitted, and
detecting (34) the pressure being applied to the fuel hose (10) by means of the vehicle (4), and extracting (36) the first signal to be transmitted from the detected pressure.

2. The method according to claim 1, further comprising:
varying (38) a mass flow through the vehicle (4) tapped from the vehicle (4) by superimposing a specified base mass flow with a mass flow sequence in order to modulate a second signal to be transmitted, and
detecting (40) the mass flow passing through the fuel hose (10) through the fueling device (2) and extracting the second signal to be transmitted from the detected mass flow.

3. The method according to claim 1, further comprising:
replacing identification features of the fueling device (2) and the vehicle (4) or a cryptographic key, and
establishing a radio connection of the fueling device (2) and the vehicle (4) using the identification features or the cryptographic key.

4. The method according to claim 1, wherein the base pressure (22) increases or decreases over time.

5. The method according to claim 1, wherein the pressure sequence (24) is based on a rectangular, sinusoidal, or sawtooth signal, wherein an amplitude of the rectangular, sinusoidal, or sawtooth signal falls below the base pressure (22).

6. The method according to claim 1, further comprising the initiation of a fueling operation at a specified secure minimum pressure as the base pressure (22), after which the varying (32) of the pressure occurs.

7. The method according to claim 2, further comprising a control of the pressure at the fueling device (2) for accelerated fueling based on a pressure request transmitted by the vehicle (4) by means of the second signal.

8. A system (5) for a communication between a fueling device (2) and a vehicle (4), wherein the fueling device (2) comprises a fuel hose configured to be coupled to a tank (6) of the vehicle (4), wherein the fueling device (2) is configured to provide a fuel that has been subjected to variable pressure through the fuel hose (10), wherein the fueling device (2) comprises a first control unit (12), which is configured to cause (32) the pressure to vary on the fuel hose (10) by superimposing a specified base pressure (22) with a pressure sequence (24) in order to modulate a first signal to be transmitted, wherein the vehicle (4) comprises a second control unit (14), which is configured to detect the pressure being applied to the fuel hose (10) via a tank pressure sensor (16) and to extract the first signal to be transmitted from the detected pressure.

9. The system (5) according to claim 8, wherein the second control unit (14) is configured to vary, by means of a tank valve (18), a mass flow by superimposing a specified base mass flow with a mass flow sequence in order to modulate a second signal to be transmitted, and wherein the first control unit (12) is configured to detect via a mass flow sensor (20) the mass flow passing through the fuel hose (10) and to extract the second signal to be transmitted from the detected mass flow.

10. A system (5) according to claim 8 wherein the fueling device (2) is a hydrogen fueling device.

* * * * *